Patented Apr. 8, 1952

2,592,211

UNITED STATES PATENT OFFICE 2,592,211

SOLUBLE INTERPOLYMERS OF DIALLYLIC MALEATES AND ALLYLIC CHLORIDES

Pliny O. Tawney, Passaic, N. J., assignor to United States Rubber Company, New York, N. Y., a corporation of New Jersey No Drawing. Application November 12, 1948, Serial No. 59,788

6 Claims. (Cl. 260—78.5)

1

The invention relates primarily to a new class of soluble and unsaturated binary copolymers of a di-2-alkenyl maleate and a 2-alkenyl chloride, which can be converted to an insoluble and essentially infusible state by further polymerization or copolymerization.

Polymers of di-2-alkenyl maleates, e. g., diallyl maleate, are of considerable interest to the plastics industry by virtue of their outstanding properties, including their thermal stability, solvent resistance and optical clarity. However, their preparation is attended by the formation of an insoluble gel, and the resulting heterogeneous mixture of gel, low molecular weight polymers and unreacted monomer is of limited utility in many commercial applications such as impregnating, laminating and coating. The latter processes ordinarily require an initially soluble, fusible resin which, after application, can be converted or cured to an insoluble, infusible state. Such soluble, convertible polymers of di-2-alkenyl maleates can be obtained by halting the polymerization before gelation occurs although in such cases only a very minor amount of the di-2-alkenyl maleate has been converted to the polymeric form. The polymer must therefore be isolated and purified to remove unreacted starting materials and the latter must be in turn purified and recycled for use in subsequent polymerizations in order to endow the process with some degree of economic feasibility. The prior art has suggested that the efficiency of this process can be improved by the use of various devices to postpone gelation whereby a higher conversion of the di-2-alkenyl maleate to the polymeric form can be secured before gelation. However, in practice such devices as elevated reaction temperatures, and large amounts of diluents, catalysts, inhibitors, etc., actually effect only disproportionately small increases in the yield of soluble polymer and necessitate additional purification steps in order to remove inhibitors, unreacted catalyst fragments, so that the resulting polymer may retain its desirable properties.

I have now unexpectedly discovered that the major proportion of a di-2-alkenyl maleate can be converted to the soluble, polymeric form without danger of insolubilization, by copolymerization thereof with a 2-alkenyl chloride in the absence or presence of a styrene. In contrast to the prior art, the reaction of my invention proceeds readily at moderate temperatures and in the absence of the special precautions and devices heretofore employed by the art in attempts to postpone or avert gelation. Moreover, since my new products are more uniform and homogeneous

2 in character, elaborate and expensive purification procedures are usually unnecessary.

The method of my invention consists in copolymerizing a di-2-alkenyl maleate with from 0.2 to 6.0 molar equivalents of a 2-alkenyl chloride and from 0.0 to 6.0, preferably 0.5 to 5.0, molar equivalents of the styrene, at temperatures of from 25° C. to 125° C., preferably from 50° C. to 110° C., and for times sufficient to effect an adequate degree of reaction, such times being ordinarily in the range of from 5 to 200 hours, and preferably from about 10 to 100 hours. The reaction is promoted by free radicals supplied by peroxidic compounds, such as benzoyl peroxide, acetyl peroxide, and tertiary-butyl hydroperoxide. These promoters are employed in amounts of from 0.1% to 15%, and usually from 0.1% to 10% by weight of the reactant mixture.

Suitable 2-alkenyl chlorides includes allyl, 2-methallyl, 2-ethallyl, 2-chloroallyl, 2-(hydroxymethyl)allyl, 2-(chloromethyl)allyl, tiglyl, crotyl, 4-chloro-crotyl, and cinnamyl chlorides, of which those containing the terminal methylene group are preferred, e. g., allyl chloride and 2-methallyl chloride. Other 2-alkenyl halides, e. g., methallyl fluoride, allyl bromide, and allyl iodide, are likewise operable in my invention, but to a varying degree. The 2-alkenyl bromides and iodides suffer the additional disadvantage of yielding resins of inferior resistance to discoloration, particularly at elevated temperatures. The maleates employed in my invention are the normal esters of maleic acid with 2-alkenyl alcohols from the class of allyl, 2-methallyl, 2-ethallyl, 2-chloroallyl, 2-(hydroxymethyl)allyl, 2-(chloromethyl)allyl, tiglyl, crotyl, 4-chlorocrotyl, and cinnamyl alcohols, of which the maleic esters of those 2-alkenyl alcohols containing a terminal methylene group, e. g., diallyl maleate and dimethallyl maleate, are preferred.

The course of the interpolymerization reactions can be followed by observing the increase in the viscosities of the reaction mixtures and the products can be isolated by precipitation, through the addition of a non-solvent, e. g., n-hexane, or by removal of unreacted starting materials through distillation or preferential extraction. The resulting products are then in commercially usable form, and only for specialized applications, such as optical castings, in any further purification ordinarily necessary. Such purification can be effected by dissolving the copolymer in a minimum volume of a solvent such as acetone or chloroform and reprecipitating it by the addition of a non-solvent.

These new copolymers possess the additional advantage of being flame-retardant. In fact, the copolymers containing a relatively large amount of a 2-alkenyl chloride, particularly the 2-alkenyl chlorides containing one or more additional halogen atoms, are sufficiently flame-resistant to render them eminently suitable for flame-proofing various combustible materials, including textiles and wood. Where the products are to be employed as the base for coating compositions, ternary interpolymers of a higher degree of compatibility with cheap hydrocarbon diluents, e. g., xylene, can be secured by interpolymerizing the di-2-alkenyl maleate and the 2-alkenyl chloride with from 0.2 to 5.0 molar equivalents (per mole of maleate) of styrene or a substituted styrene from the class of alpha-methylstyrene, p-methylstyrene, p-methoxystyrene, p-chlorostyrene, o,p - dichlorostyrene, p - trichloromethylstyrene, p-fluorostyrene, p-trifluoromethylstyrene.

My copolymers, both the binary and the ternary, can be employed in the solid form as thermosetting molding powders for the preparation of various industrial shapes, including rods, blocks and sheets. However, the flame-retardant properties render them particularly attractive as coating, impregnating and laminating compositions. For such purposes the copolymers can be dissolved in appropriate solvents, or the crude interpolymerization reaction mixtures can themselves be employed by the addition of higher-boiling solvents and subsequent distillation to remove any unreacted 2-alkenyl chloride. My interpolymers can likewise be dissolved in a number of liquid, ethylenically unsaturated, copolymerizable compounds, e. g., butyl acrylate, benzyl acrylate, methyl methacrylate, vinyl butyrate, and diallyl fumarate, to yield solutions capable of being totally polymerized without leaving any solvent to be evaporated. Such solutions are of particular interest in applications where removal of a diluent from a coating or impregnating composition is uneconomical or provides a technical or a health hazard. They are likewise useful in molding operations where an initially fluid composition is required which can ultimately be set or cured in the final shape with a minimum of shrinkage.

Heating compositions containing my new copolymers at such temperatures as 60° C.–120° C. induces further polymerization whereby the products are rendered substantially infusible as well as resistant to attack by solvents. Suitable inert addends including dyes, pigments, fillers and plasticizers can be incorporated with my new copolymers, preferably at the soluble, fusible stage prior to the final cure.

The following examples disclose my invention in more detail. All parts are by weight.

*Example 1*

Mixtures of diallyl maleate and various 2-alkenyl chlorides are heated at 60° C. in the presence of benzoyl peroxide as a promoter until in each case the point of incipient gelation is attained or no further increase in the viscosity of the reaction mixture is discernible. The reaction mixtures are then diluted with an excess of n-hexane and the precipitated polymeric materials are further purified by dissolving them in a minimum volume of chloroform and reprecipitating them in an excess of n-hexane. The products are finally dried in vacuo to constant weight.

In Table I below are summarized the amounts of the monomeric starting materials, the peroxide, and the polymeric product, as well as the reaction times, and an example of the prior art polymerization of diallyl maleate in the absence of a 2-alkenyl chloride (I–a) is likewise included to further emphasize the advantages of my invention.

TABLE I

| Ex. | Diallyl Maleate | 2-Alkenyl Chloride | Benzoyl Peroxide | Reaction Time (Hours) | Polymeric Product |
|---|---|---|---|---|---|
| a | 100 |  | 1.23 | 7.0 | 18.4 |
| b | 100 | Allyl Chloride, 22.9 | 2.04 | 10.50 | 31.0 |
| c | 100 | Allyl Chloride, 100 | 4.0 | 37.75 | 71.8 |
| d | 100 | Allyl Chloride, 200 | ² 6.0 | 204.0 | 137.7 |
| e | 100 | Methallyl Chloride, 30.8 | 2.08 | 45.5 | 65.8 |
| f | 100 | 2,3-Dichloropropene, 100 | 4.0 | ¹ 120.0 | 137.8 |
| g | 100 | 2(Chloromethyl) allyl chloride, 100 | 4.0 | 39.75 | 91.4 |

¹ No evidence of incipient gelation.
² Peroxide added in equal increments at 24-hour intervals.

Analysis of the copolymer obtained in I–b (59.40% C; 6.29% H; 4.92% Cl) corresponds to that of a copolymer containing by weight approximately 10.62% of allyl chloride and 89.38% of diallyl maleate. The copolymer of I–e contains approximately 19.18% of methallyl chloride and 81.82% of diallyl maleate (59.81% C; 6.42% H; 7.51% Cl).

From Table I above it is apparent that the copolymerization of di-2-alkenyl maleate with even relatively small proportions, as little as around 20%, of a 2-alkenyl chloride effects a significant increase in the amount of the monomeric di-2-alkenyl maleate which is converted to the soluble polymeric form prior to gelation. Moreover, as the amount of the copolymerizable 2-alkenyl chloride in the reaction mixture is increased, the conversion of the di-2-alkenyl maleate to the soluble copolymeric form is likewise increased. In this manner the major proportion of the di-2-alkenyl maleate can be converted to a soluble polymeric form without danger of gelation.

*Example 2*

A mixture of equal weights of diallyl maleate and 2,3-dichloropropene, together with 2% by weight of the reaction mixture of benzoyl peroxide, is heated at 60° C. for approximately 120 hours without gelation. The reaction product is then isolated and purified as in Example 1, and approximately a 69% yield of solid interpolymer is obtained.

Analysis—Found: percent Cl, 31.20; iodine number (Wijs), 48. The analysis corresponds to an interpolymer containing approximately 48.7% by weight of interpolymerized 2,3-dichloropropene and 51.3% of diallyl maleate.

Upon heating a sample of the interpolymer with 1% of benzoyl peroxide at 100° C. for approximately 4.5 hours, an acetone-insoluble and heat-resistant product is obtained.

A solution of 10 parts of the interpolymer in 10 parts of diethyl fumarate which also contains 0.2 part of benzoyl peroxide is poured into a cylindrical mold and heated at 60° C. for 48 hours, and then at 90° C. for 16 hours. The resulting hard, clear casting is insoluble in acetone and in ethanol.

*Example 3*

(a) One hundred parts of diallyl maleate are mixed with 56.6 parts of 2,3-dichloropropene and 2.52 parts of benzoyl peroxide and heated at 60°

C. for 45.5 hours. The reaction product is isolated and purified as in Example 1 to yield 82.2 parts of white polymeric solid which is soluble in acetone, benzene, ethyl acetate and chloroform, and insoluble in carbon tetrachloride, n-hexane and ethanol. The copolymer will not support combustion.

(b) Ten parts of copolymer 3–a are dissolved in 4.5 parts of diethyl fumarate together with 0.09 part of benzoyl peroxide. The solution is poured into a mold and cured by heating for 22 hours at 60° C., then 7 hours at 90° C., and finally at 120° C. for 2 hours. The resulting clear, flame-resistant casting is insoluble in acetone and chloroform, and has Rockwell hardnesses of L–98 and M–83.

(c) Seven and fifty-two hundredths parts of copolymer 3–a are found to dissolve very rapidly in 3.22 parts of monomeric styrene containing 0.02 part of benzoyl peroxide to yield a solution of low viscosity. This is poured into a cylindrical mold and cured by heating for 18 hours at 60° C., then 3 hours at 90° C., and finally 2 hours at 120° C. to yield a clear, flame-resistant casting having Rockwell hardnesses of L–74 and M–46. The casting is insoluble in acetone and chloroform.

*Example 4*

(a) A mixture of 100 parts of diallyl maleate, 170 parts of 2,3-dichloropropene and 4.95 parts of benzoyl peroxide is heated at 60° C. for 19.5 hours. The copolymeric product is isolated and purified as in Example 1 to yield 197 parts of white, polymeric solid which is readily soluble in acetone, chloroform, and ethyl acetate, but insoluble in ethanol, carbon tetrachloride, and n-hexane.

Analysis—Found: 34.29% Cl; iodine number (Wijs), 36.3. The analysis corresponds to a copolymer containing approximately 53.5% by weight of 2,3-dichloropropene and 46.5% of diallyl maleate.

(b) Ten parts of the copolymer of 4–a dissolve rapidly in 4.5 parts of monomeric styrene containing 0.09 part of benzoyl peroxide to yield a solution of low viscosity. This is poured into a mold and cured by heating for 16 hours at 60° C., then 5 hours at 90° C., and finally 2 hours at 120° C. to yield a clear, hard casting which is non-flammable and self-extinguishing, and which is likewise insoluble in acetone and chloroform.

Having thus described my invention, what I claim and desire to protect by Letters Patent is:

1. An acetone-soluble unsaturated binary interpolymer of a mixture of monomeric di-2-alkenyl maleate with 0.2 to 6.0 molar equivalents of a monomeric 2-alkenyl chloride, said interpolymer containing residual unsaturation and being capable of further polymerization, the alkenyl group in each instance being an aliphatic group having from 3 to 4 carbon atoms.

2. An acetone-soluble unsaturated binary interpolymer of a mixture of monomeric diallyl maleate with 0.2 to 6.0 molar equivalents of monomeric allyl chloride, said interpolymer containing residual unsaturation and being capable of further polymerization.

3. An acetone-soluble unsaturated binary interpolymer of a mixture of monomeric diallyl maleate with 0.2 to 6.0 molar equivalents of monomeric methallyl chloride, said interpolymer containing residual unsaturation and being capable of further polymerization.

4. A process which comprises polymerizing a binary monomer mixture comprising a monomeric di-2-alkenyl maleate and a monomeric 2-alkenyl chloride, the alkenyl group in each instance being an aliphatic group having from 3 to 4 carbon atoms, and a peroxidic compound, in the proportion of 0.2 to 6.0 moles of the chloride per mole of the maleate, and halting the reaction before an acetone-insoluble product is formed, whereby to produce an acetone-soluble, fusible, unsaturated binary interpolymer of the said maleate and the 2-alkenyl chloride.

5. A process which comprises polymerizing a binary monomer mixture comprising a monomeric di-2-alkenyl maleate and a monomeric 2-alkenyl chloride, the alkenyl group in each instance being an aliphatic group having from 3 to 4 carbon atoms, and a peroxidic compound, in the proportion of 0.2 to 6.0 moles of the chloride per mole of the maleate, for a time during which only an acetone-soluble, fusible binary interpolymer is formed, and thereupon halting the reaction by cooling the reaction mixture, whereby to avoid forming any appreciable amount of acetone-insoluble interpolymer of said monomers.

6. A solution of an acetone-soluble, unsaturated binary interpolymerizate of a mixture of a monomeric di-2-alkenyl maleate with 0.2 to 6 molar equivalents of a monomeric 2-alkenyl chloride, the alkenyl group in each instance being an aliphatic group having from 3 to 4 carbon atoms, in a liquid, ethylenically unsaturated, monomeric compound copolymerizable with said binary interpolymerizate.

PLINY O. TAWNEY.

REFERENCES CITED

The following references are of record in the file of this patent:

UNITED STATES PATENTS

| Number | Name | Date |
|---|---|---|
| 2,403,213 | D'Alelio | July 2, 1946 |
| 2,433,616 | Marple et al. | Dec. 30, 1947 |
| 2,498,084 | Kuderna et al. | Feb. 21, 1950 |
| 2,498,099 | Tawney et al. | Feb. 21, 1950 |